United States Patent
Moore et al.

(10) Patent No.: US 7,104,044 B2
(45) Date of Patent: Sep. 12, 2006

(54) METHOD FOR REDUCING THE EXHAUST EMISSIONS FROM AN ENGINE SYSTEM

(75) Inventors: Jeremy Moore, Ypsilanti, MI (US); Mark Eifert, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 10/688,707

(22) Filed: Oct. 18, 2003

(65) Prior Publication Data

US 2004/0128981 A1    Jul. 8, 2004

(30) Foreign Application Priority Data

Oct. 18, 2002  (EP) .................... 02102464

(51) Int. Cl.
*F01N 3/00* (2006.01)

(52) U.S. Cl. .............................. 60/284; 60/274; 60/285

(58) Field of Classification Search ................ 60/274, 60/284, 300, 285; 477/98, 100
See application file for complete search history.

(56) References Cited

U.S. PATENT DOCUMENTS

| | | | |
|---|---|---|---|
| 3,895,541 A * | 7/1975 | Nohira et al. ............... 477/97 | |
| 4,305,254 A | 12/1981 | Kawakatsu et al. | |
| 4,407,132 A | 10/1983 | Kawakatsu et al. | |
| 4,533,011 A | 8/1985 | Heidemeyer et al. | |
| 5,343,970 A | 9/1994 | Severinsky | |
| 5,390,493 A * | 2/1995 | Fujishita et al. ............... 60/284 |
| 5,459,998 A * | 10/1995 | Hosoya et al. ................ 60/284 |
| 5,495,906 A | 3/1996 | Furutani | |
| 5,503,804 A * | 4/1996 | Fujishita et al. ............ 422/109 |
| 5,553,451 A * | 9/1996 | Harada ........................ 60/277 |
| 5,804,148 A * | 9/1998 | Kanesaka et al. ........... 422/174 |
| 5,842,534 A | 12/1998 | Frank | |
| 5,969,624 A | 10/1999 | Sakai et al. | |
| 5,979,158 A * | 11/1999 | Kaiser et al. ................. 60/274 |
| 6,381,955 B1 * | 5/2002 | Morganti et al. ............. 60/300 |

FOREIGN PATENT DOCUMENTS

EP    1136311 A2    9/2001

* cited by examiner

*Primary Examiner*—Thomas Denion
*Assistant Examiner*—Diem Tran
(74) *Attorney, Agent, or Firm*—Diana D. Brehob

(57) ABSTRACT

The invention relates to a method for reducing the exhaust emissions during the cold start of an internal combustion engine (3). According to the method, a starter motor (4) is operated in parallel with the internal combustion engine (3) until the operating temperature of an exhaust gas catalytic converter (1) is reached, to thereby relieve the power demand on the internal combustion engine and thereby to minimize the production of pollutants. The heating of catalytic converter (1) can preferably be accelerated by retarded spark timing, by a delayed shift in automatic transmission (6) and/or by an electrical heater coupled to catalytic converter (1).

21 Claims, 1 Drawing Sheet

METHOD FOR REDUCING THE EXHAUST EMISSIONS FROM AN ENGINE SYSTEM

FIELD OF THE INVENTION

The invention relates to a method for reducing exhaust emission during cold start of an internal combustion engine which is coupled to a starter motor. The engine has an exhaust gas treatment device arranged in the exhaust pipe. Furthermore, the invention relates to an engine system comprising an internal combustion engine, a starter motor coupled thereto and an exhaust gas treatment device arranged in the exhaust pipe of the internal combustion engine.

BACKGROUND OF THE INVENTION

Exhaust gas treatment devices are customarily used to remove pollutants, such as hydrocarbons (HC) and nitrogen oxides ($NO_x$), from the exhaust gas of internal combustion engines. However, these exhaust gas treatment devices have to reach a certain operating temperature before they become active. Therefore, for a certain period of time after the cold start of an engine, pollutants are discharged to the atmosphere to an unabated extent, which makes a considerable contribution to the overall quantity of pollutants emitted during a journey.

To minimize exhaust emissions during a cold start, it is desirable to shorten the time required to reach the operating temperature of the exhaust gas treatment device. To do this, the load on the internal combustion engine is often artificially increased to generate a considerable flow of exhaust gas at relatively high temperature. However, the higher load on the internal combustion engine at the same time leads to an increased production of pollutants, which runs contrary to the desired reduction in emissions.

SUMMARY OF THE INVENTION

Disadvantages of prior approaches are overcome by a method for reducing exhaust emissions during cold start of an internal combustion engine, the engine being coupled to a starter motor and an exhaust gas treatment device, including providing assist to the engine by the starter motor to meet a demanded power when a temperature of the exhaust gas treatment system is less than an operating temperature of the exhaust gas treatment device, retarding spark timing of the engine, heating the exhaust gas treatment device by electric heater coupled to the exhaust gas treatment device, and delaying a shifting operation of an automatic transmission coupled to the internal combustion engine. The method further includes meeting existing and impending power demands of drive system auxiliary devices with the starter motor. The method also includes operating the starter motor as a generator after the operating temperature of the exhaust gas treatment device has been reached.

In an alternative embodiment, a method is disclosed for reducing exhaust emissions during cold start of an internal combustion engine, the engine being coupled to a starter motor and an exhaust gas treatment device, including: supplying fuel to the internal combustion engine when an engine rotational speed substantially exceeds idle speed. Nowadays, cold engine idle speed is approximately 1000 rpm and drops to around 800 rpm when the engine is warm. The fuel is, therefore, supplied considerably later than in known starting methods, in which the supply of fuel generally starts when the engine is rotating at approximately 100 to 300 rpm, referred to as cranking speed by those skilled in the art. This delayed injection of fuel until engine speed attains nearly 1000 rpm leads to a considerable reduction in the exhaust emissions. A particularly high level of emission reduction is obtained when this method is combined with the above-described reduction in power demand on the internal combustion engine by parallel operation of the starter motor.

The method is distinguished by the fact that the internal combustion engine is assisted by the starter motor until the operating temperature of the exhaust gas treatment device is reached.

The starter motor is needed to start up the internal combustion engine. As soon as the latter is able to maintain its rotation of its own accord through the combustion of fuel, the starter motor is customarily switched off. In contrast, the inventive method has the starter motor continuing to operate even after the internal combustion engine has started running, thus providing mechanical power in parallel with the internal combustion engine. A customary starter motor generally is not able to apply sufficient power to carry out the invention method. Thus, a modified starter motor is used. This is sometimes referred to, by those skilled in the art, as a starter-generator. A starter-generator combines the usually separate functions of starter motor and generator in a single component. The starter-generator is usually directly coupled to the crankshaft of the internal combustion engine. The power contribution made by the starter motor reduces the power requirement on the internal combustion engine accordingly. Under extreme circumstances, the starter motor can even take over the entire mechanical load of the drive train and any auxiliary devices (pumps, etc.) which may be active. On account of the reduced power, the internal combustion engine generates fewer pollutants. It is possible to reduce the exhaust emissions during the cold start, even though the lower exhaust gas temperatures mean that it generally takes longer for the exhaust gas treatment device to reach its operating temperature.

Power output from the starter motor during cold start is preferably regulated so that existing and/or impending power demands on the part of the drive system and/or auxiliary devices of the motor vehicle (for example pumps) are met by the starter motor. The anticipatory control of the starter motor with a view to future power demands ensures that that the internal combustion engine and therefore the emission of pollutants.

After the operating temperature of the exhaust gas treatment device has been reached, i.e., after the cold start has ended, the starter motor is preferably operated as a generator. The electrical energy consumed by operation of the starter motor during cold start can then be regenerated.

To further minimize exhaust emissions during a cold start, it is possible to accelerate the rate at which the operating temperature of the exhaust gas treatment device is reached. This acceleration can be effected, for example, by retarding the spark timing, by heating the exhaust gas treatment device by an electrical heater, and/or by delaying shifting of an automatic transmission coupled to the internal combustion engine.

An engine system is disclosed which has an internal combustion engine, a starter motor coupled to said engine, an exhaust gas treatment device arranged in an engine exhaust of said engine; and a control unit electronically coupled to the engine and the starter motor. The engine system is characterized by a control unit which is coupled to the starter motor, the control unit being designed so as to carry out one of the methods of the type explained above, i.e., according to a first variant the control unit can actuate the starter motor in such a way that the latter is operated until the operating temperature of the exhaust gas treatment device is reached, so that the load on the internal combustion engine is reduced or minimized. According to a second variant, the control unit is (additionally or alternatively) designed in so that supply of fuel to the internal combustion engine is only initiated when a rotational speed nearly matches idle speed.

The starter motor of the engine system may in particular be a starter-generator, which can be operated both as a starter, which converts electrical energy into mechanical energy, and as a generator, which converts mechanical energy into electrical energy. Powerful integrated starter-generators are present, in particular, in modern motor vehicles which are operated in a stop-and-go mode, in which the internal combustion engine is switched off each time the vehicle is stationary for a prolonged period of time.

According to a refinement of the engine system, the exhaust gas treatment device has an electric heater. This heater is used to actively heat the exhaust gas treatment device during cold start.

BRIEF DESCRIPTION OF THE FIGURE

In the text which follows, the invention is explained in more detail, by way of example, on the basis of the figure.

DETAILED DESCRIPTION

Figure 1:
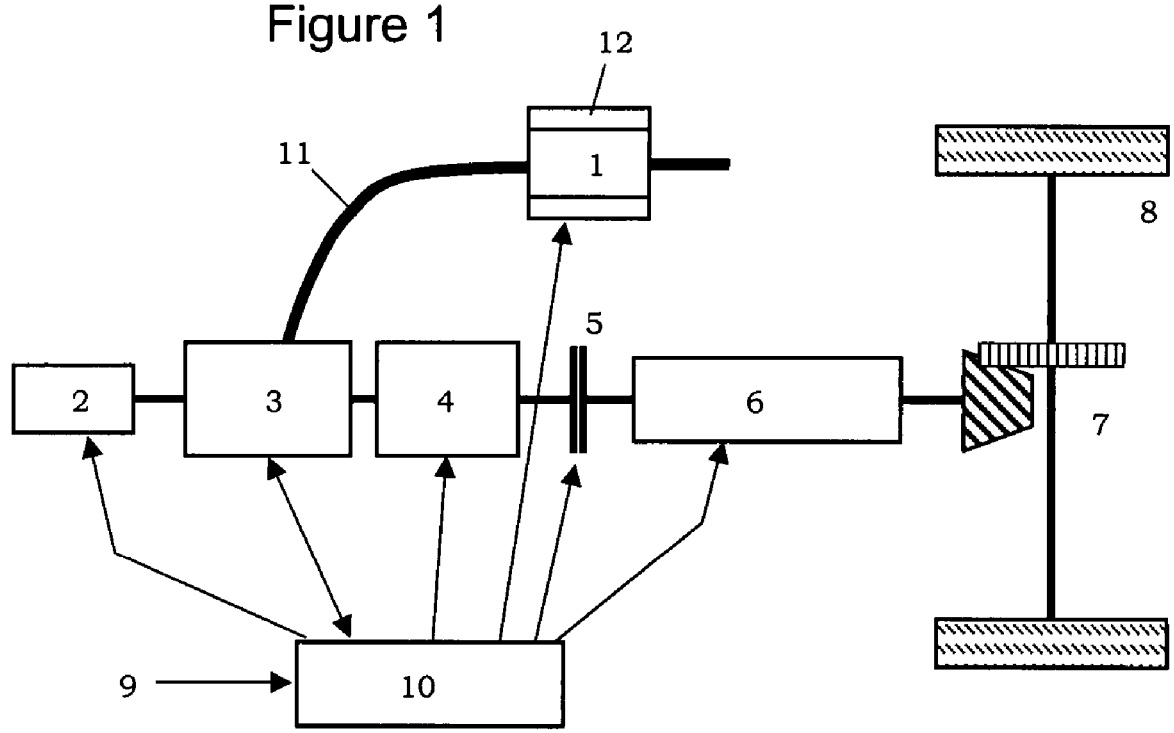
FIG. 1 diagrammatically depicts the components of an engine system according to the invention.

The engine system comprises a drive train which, includes: an internal combustion engine 3, a starter-generator 4 arranged on the output shaft of the internal combustion engine 3, a clutch 5, an automatic transmission 6, a final drive 7 and the driven wheels 8. In the exhaust pipe 11, which branches off from the internal combustion engine 3, there is a catalytic converter 1 as an example of a exhaust gas treatment device, which is coupled to an electric heater 12. The heater can be integral with exhaust gas treatment device 1. Alternatively, it is a heater unit coupled to exhaust gas treatment device 1. Furthermore, additional devices 2, for example pumps, are driven by internal combustion engine 3.

When the illustrated engine system is operating, it is found that the initial duration (around fifteen seconds) after a cold start of the internal combustion engine 3 are critical to the total quantity of pollutants emitted during the driving time. The reason is that catalytic converter 1 only becomes active once a minimum operating temperature has been reached. To shorten the warm-up time required by means of a higher flow of exhaust gas at a higher temperature, therefore, the power demand on the internal combustion engine 3 is often artificially increased during the cold start.

Contrary to this known procedure, according to the invention, the power demand on the internal combustion engine 3 is reduced or minimized during warm up by starter-generator 4 continuing to operate even after internal combustion engine 3 has started up, so that it can feed mechanical power into the drive train. In the extreme or ideal scenario, this power from starter-generator 4 may be so great that it generates the entire power required to drive the motor vehicle and operate the additional devices 2. The associated reduced power demand on internal combustion engine 3 means that its production of HC and $NO_x$ emissions is minimized. Therefore, the primary aim is not to heat the catalytic converter 1 as quickly as possible (without taking account of the additional emissions which this causes), but rather to minimize the production of pollutants. It has been found that in this way it is possible to reduce the overall emission level despite the warm-up phase of catalytic converter 1 being longer.

To carry out the method according to the invention, a suitably configured electronic control unit 10 is provided, which may be designed, for example, as a microcomputer or as a program in an existing engine management system. The control unit 10 is designed to control the power of the starter-generator 4 in such a way that the power demands for driving the motor vehicle and for measured or predicted demands from the additional devices 2 are met. For this purpose, control unit 10 is coupled to additional devices 2, internal combustion engine 3, starter-generator 4, catalytic converter 1 and an electric heater 12 which is present therein, clutch 5 and transmission 6. Furthermore, control unit 10 receives information about the demand for driving power from a device 9 (for example the accelerator pedal), so that it can respond to this demand. Since power draw is substantially transferred to starter-generator 4, internal combustion engine 3 can then warm up under a low load and therefore with low emissions of pollutants.

By reducing the power demand on internal combustion engine 3, it may typically take two to three minutes for catalytic converter 1 to reach its operating temperature. The warm-up time substantially depends on ambient temperature and the mass flow of warm exhaust gases, which is a function of engine size and engine speed. To shorten warm-up time, control unit 10 can initiate further measures, such as for example retarding spark timing and delaying shift points in automatic transition 6. Furthermore, catalytic converter 1 may additionally be heated by electric heater 12.

In one embodiment, the reduction in power demand on internal combustion engine 3 during a cold start can be combined with a strategy of starting at a high engine speed to further reduce the HC and $NO_x$ emissions. With a strategy of this nature, the supply of fuel to internal combustion engine 3 takes place at higher engine speeds than is customary. In particular, emissions are remarkably reduced when rotational speed at which the injection of fuel begins is increased from customarily 100 to 300 rpm to or nearly to the idling speed (approximately 800 rpm).

The starting procedure:

1. Starting the internal combustion engine 3 using the starter-generator 4 and commencing fuel injection when the rotational speed of the internal combustion engine (approximately) reaches the idling speed.
2. Measuring the additional mechanical power demands and regulating the starter-generator 4 to meet these demands.
3. Increasing the temperature of catalytic converter 1 quickly by
   a) increasing the flow of exhaust gas by delayed shifting operations in the case of a motor vehicle with an automatic transmission;
   b) delaying the spark ignition in a spark-ignition internal combustion engine;
   c) electrically heating the catalytic converter 1 if a suitable electric heater 12 is present.

After the operating temperature of the catalytic converter 1 has been reached, the power assistance provided by the starter-generator 4 is ended. Instead, the starter-generator 4 is then preferably operated as a generator, to replace the electrical energy which has been consumed during starting.

We claim:

1. A method for reducing exhaust emissions during cold start of an internal combustion engine, the engine being coupled to a starter motor and an exhaust gas treatment device, comprising:
   providing assist to the engine by the starter motor to meet a demanded power when a temperature of the exhaust gas treatment system is less than an operating temperature of the exhaust gas treatment device; and
   operating the starter motor as a generator after the operating temperature of the exhaust gas treatment device has been reached.

2. The method of claim 1 wherein power output from the starter motor is regulated to meet existing and impending power demands by drive system auxiliary devices.

3. A method for reducing exhaust emissions during cold start of an internal combustion engine, the engine being coupled to a starter motor and an exhaust gas treatment device, comprising:
   providing assist to the engine by the starter motor to meet a demanded power until a temperature of the exhaust gas treatment system reaches an operating temperature of the exhaust gas treatment device; and retarding spark timing of the engine.

4. The method of claim 3, further comprising:
   heating the exhaust gas treatment device by electric heater coupled to the exhaust gas treatment device.

5. The method of claim 3, further comprising:
   discontinuing providing assist by the starter motor when a temperature of the exhaust treatment device exceeds said operating temperature.

6. The method of claim 3 wherein said operating temperature is a temperature at which the exhaust treatment device becomes active.

7. The method of claim 4, further comprising:
   delaying a shifting operation of an automatic transmission coupled to the internal combustion engine.

8. The method of claim 7, further comprising:
   heating the exhaust gas treatment device by electric heater coupled to the exhaust gas treatment device.

9. The method of claim 3 wherein said starter motor is an integrated starter generator.

10. The method of claim 9, further comprising:
    operating said integrated starter generator as a generator when a temperature of the exhaust treatment device exceeds said operating temperature.

11. An engine system comprising:
    an internal combustion engine;
    a starter motor coupled to said engine;
    an exhaust gas treatment device arranged in an engine exhaust of said engine; and
    a control unit electronically coupled to said engine and said starter motor, said control unit causing said starter motor to provide power to reduce a power provided by said engine until said exhaust gas treatment device achieves an operating temperature wherein said electronic control unit causes spark timing of the engine to be retarded.

12. The system of claim 11 wherein said electronic control unit causes an electric heater coupled to the exhaust gas treatment device to heating the exhaust gas treatment device.

13. The system of claim 11 wherein said electronic control unit causes an electric heater coupled to the exhaust gas treatment device to heating the exhaust gas treatment device.

14. The engine system of claim 11 wherein said starter motor is an integrated starter generator.

15. A method for reducing exhaust emissions during cold start of an internal combustion engine, the engine being coupled to a starter motor and an exhaust gas treatment device, comprising:
    supplying rotational energy to the engine at rest by the starter motor;
    providing fuel to the engine when an engine rotational speed substantially exceeds an idle speed;
    continuing to operate both the engine and the starter motor after fuel is provided to the engine until the exhaust gas treatment device reaches a predetermined temperature; and
    discontinuing operation of the starter motor when a temperature of the exhaust treatment device exceeds said predetermined temperature.

16. The method of claim 15 wherein said engine supplies a lesser amount of power than otherwise because of power supplied by the starter motor when both the engine and starter motor are operating.

17. The method of claim 15 wherein said operating both the engine and the starter motor has both the engine and the starter motor providing mechanical power.

18. The method of claim 15 wherein said predetermined temperature is a temperature at which the exhaust treatment device becomes active.

19. The method of claim 15 wherein when the starter motor operation is discontinued, the starter motor provides substantially no positive or negative torque.

20. A method for reducing exhaust emissions during cold start of an internal combustion engine, the engine being coupled to a starter motor and an exhaust gas treatment device, comprising:
    supplying rotational energy to the engine at rest by the starter motor;
    providing fuel to the engine when an engine rotational speed substantially exceeds an idle speed;
    continuing to operate both the engine and the starter motor after fuel is provided to the engine until the exhaust gas treatment device reaches a predetermined temperature; and
    operating said starter motor as a generator when a temperature of the exhaust treatment device exceeds said predetermined temperature.

21. The method of claim 20 wherein said starter motor is an integrated starter generator.

* * * * *